United States Patent [19]
Lewis et al.

[11] 3,820,664
[45] June 28, 1974

[54] APPARATUS FOR TRANSPORTING FACTORY CONSTRUCTED HOUSING UNITS

[76] Inventors: Eugene C. Lewis, 1136 U.S. Highway 22, Scotch Plains, N.J. 07092; C. Robert Gottlieb, One Office Pk., Mobile, Ala. 36609; Robert H. Macy, P.O. Box 758, Pascagoula, Miss. 39567

[22] Filed: Sept. 21, 1972

[21] Appl. No.: 291,036

Related U.S. Application Data
[62] Division of Ser. No. 163,935, July 19, 1971.

[52] U.S. Cl. ................ 214/14, 114/72, 214/1 H, 214/15 R, 214/38 CA, 214/392, 280/43.23, 294/67 DB
[51] Int. Cl. .................. B65g 67/02, B63b 27/10
[58] Field of Search ....... 214/1 H, 38 CC, 14, 15 R, 214/38 CA, 38 CC, 392; 280/43.23; 294/67 DB; 193/38

[56] References Cited
UNITED STATES PATENTS

| | | | |
|---|---|---|---|
| 3,045,848 | 7/1962 | Christenson et al. | 214/392 |
| 3,086,661 | 4/1963 | DeStasi | 294/67 DB X |
| 3,169,648 | 2/1965 | Tantlinger | 193/38 X |
| 3,236,400 | 2/1966 | Turturro et al. | 214/1 H X |
| 3,448,874 | 6/1969 | Martinson | 214/38 CC X |
| 3,587,890 | 6/1971 | Hyland et al. | 214/1 H |
| 3,599,808 | 8/1971 | Bisson | 214/1 H |
| 3,663,040 | 5/1972 | Weaver et al. | 280/43.23 X |

*Primary Examiner*—Robert G. Sheridan
*Attorney, Agent, or Firm*—Lane, Aitken, Dunner & Ziems

[57] ABSTRACT

A system including method and apparatus for transporting and placing on site foundations factory constructed housing units, completely finishing interiorly to provide integral and mechanically operable living spaces ranging in size to a maximum floor area in excess of 4000 square feet. The system includes coordinated transfer and transporting units, the latter units including both marine vessels and land vehicles, which with the transfer devices are capable of maintaining at all times throughout overall system operation of factory shipping and project phases, a continuous foundation-like support to supply substantially the same measure of structural integrity to the housing unit as that supplied by a permanent foundation. The housing units of which the interior is finished completely at the factory, including interior painting, carpeting and draperies as well as other operational units such as kitchens, bathrooms, heating and airconditioning units and the like, is, after placement on the permanent site foundation, completed exteriorly by on-site placement of roofs, exterior appendages such as garages, porches, large items of exterior trim, exterior chimneys and the like.

6 Claims, 35 Drawing Figures

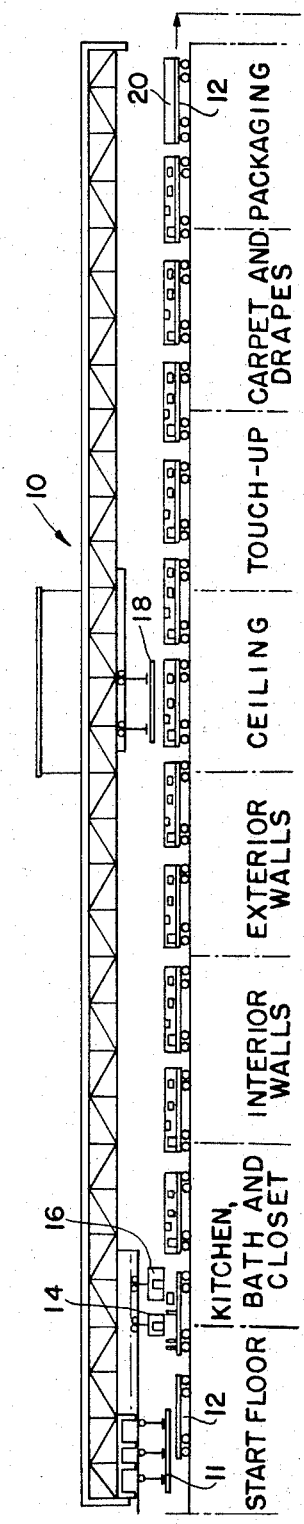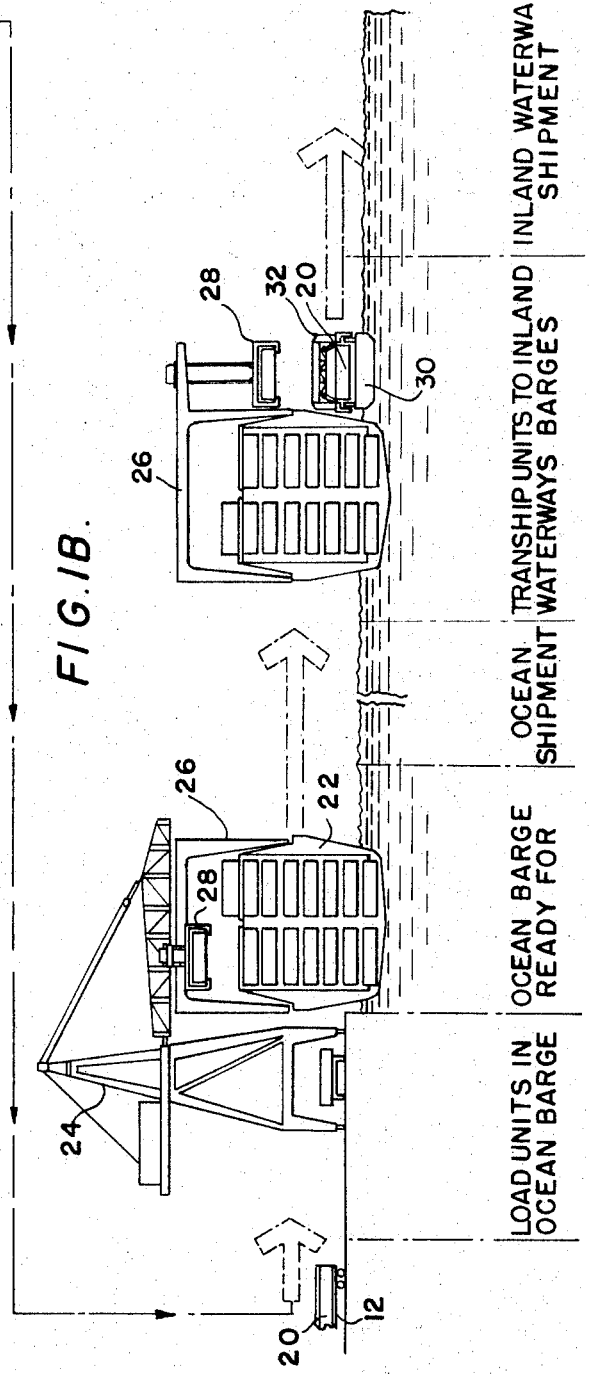

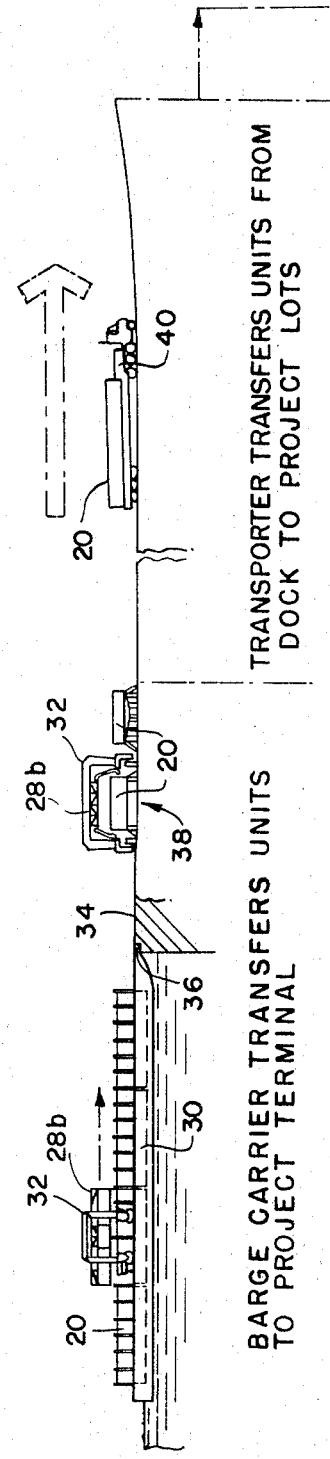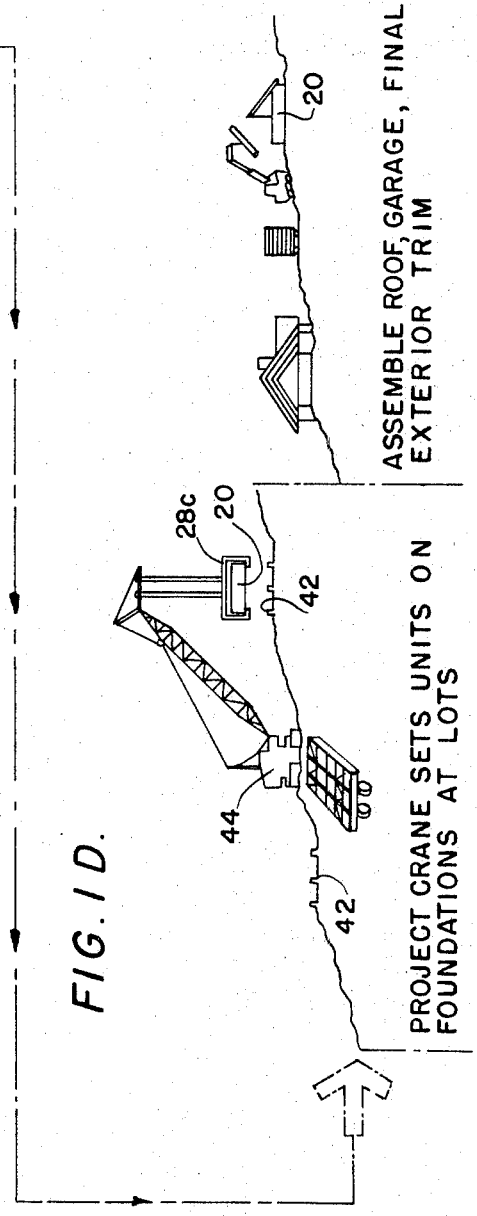

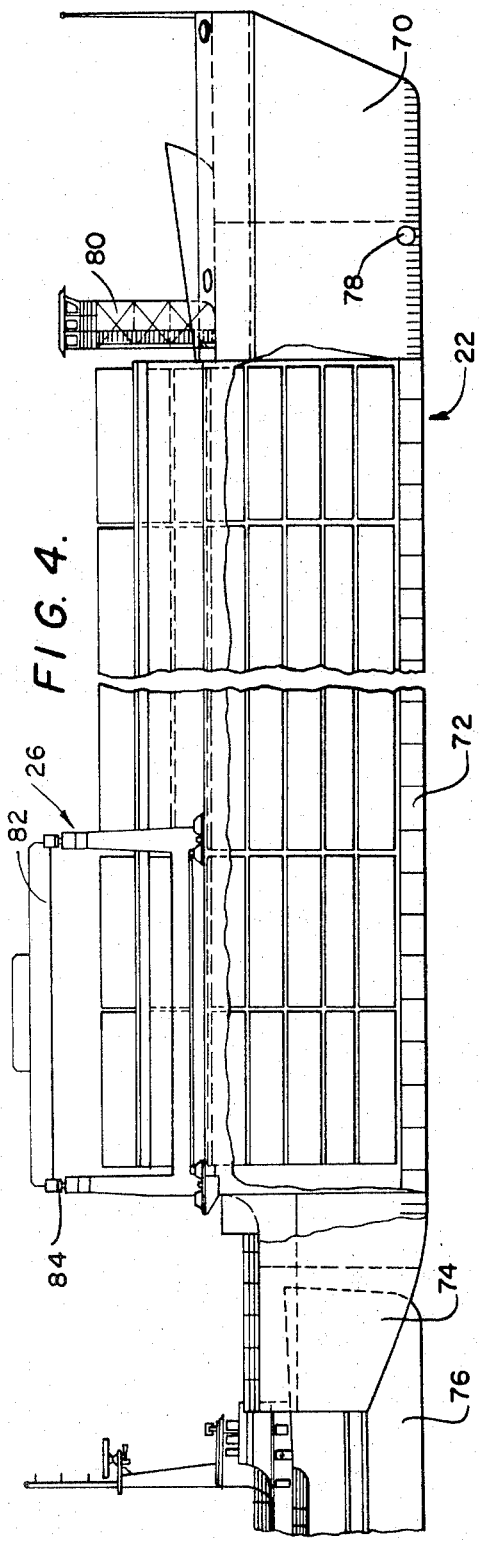
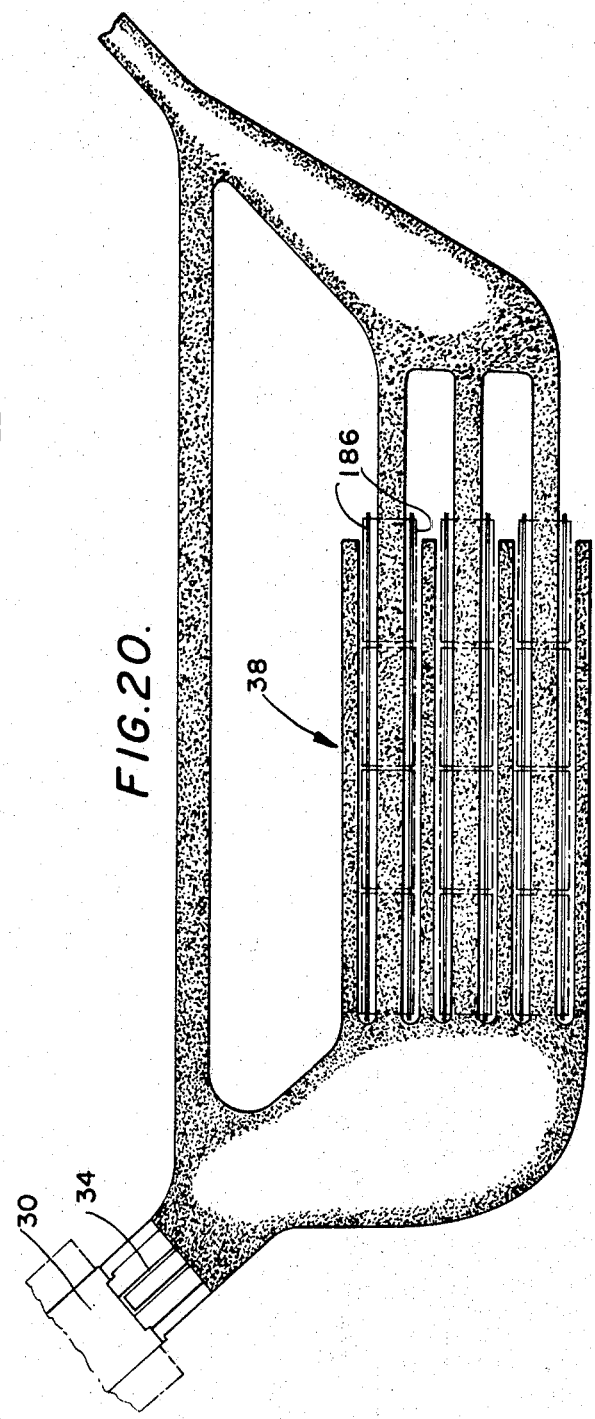

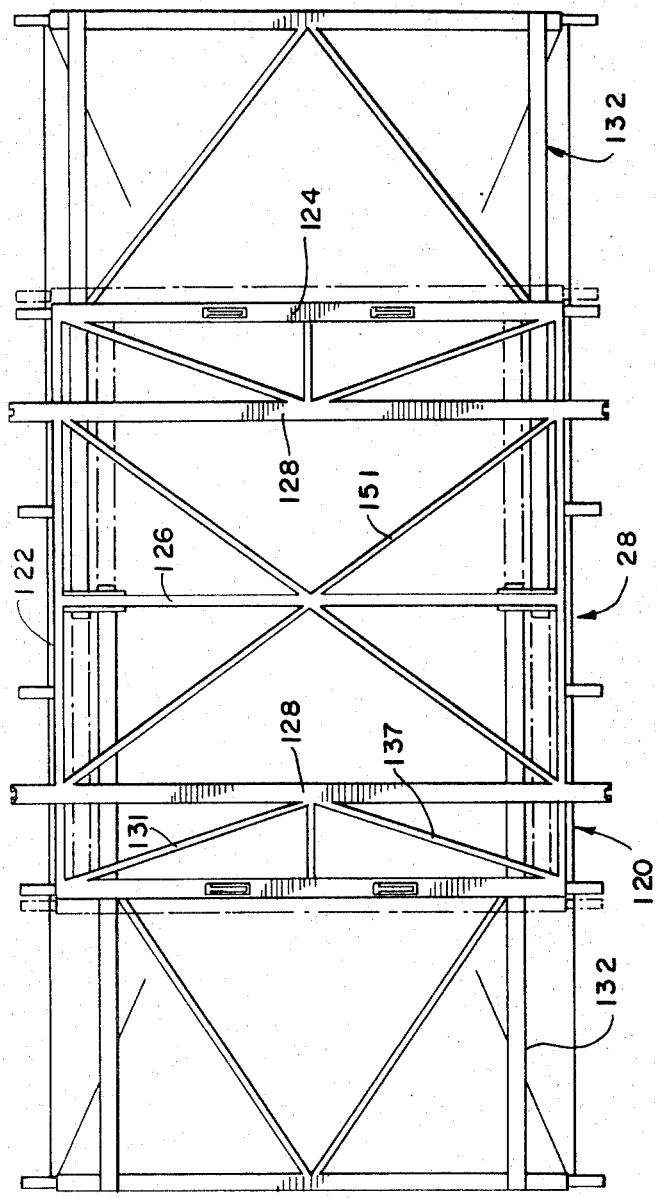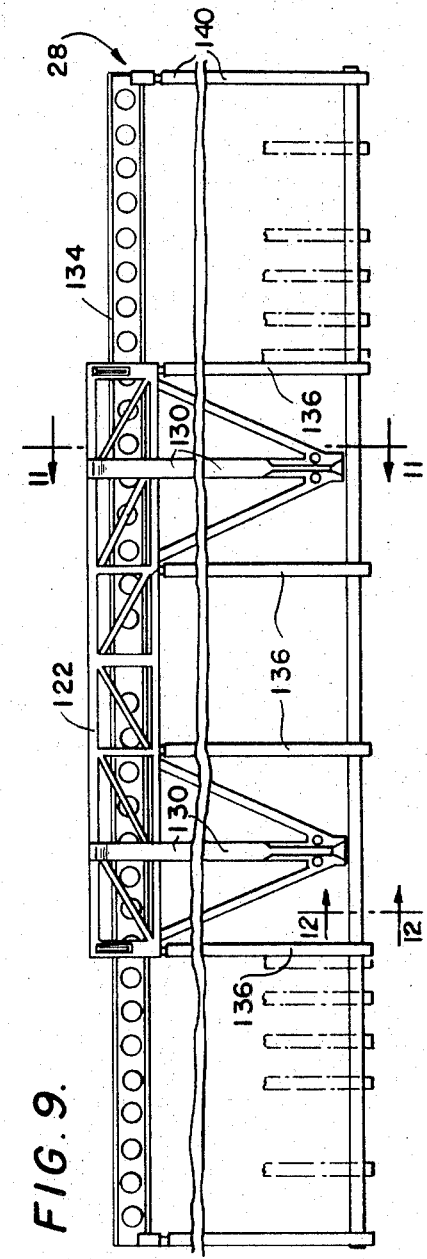
FIG. 8.
FIG. 9.

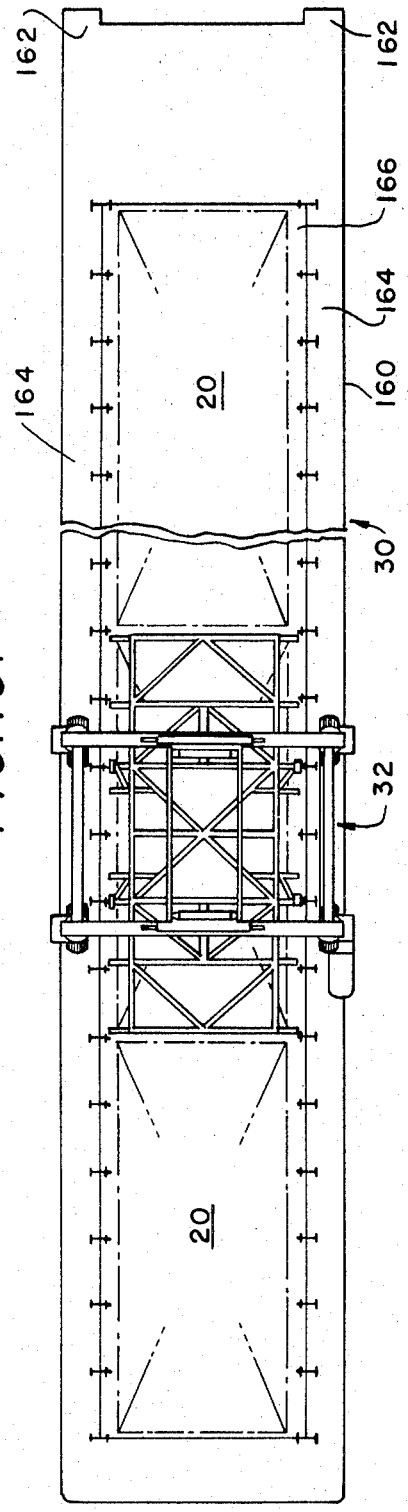
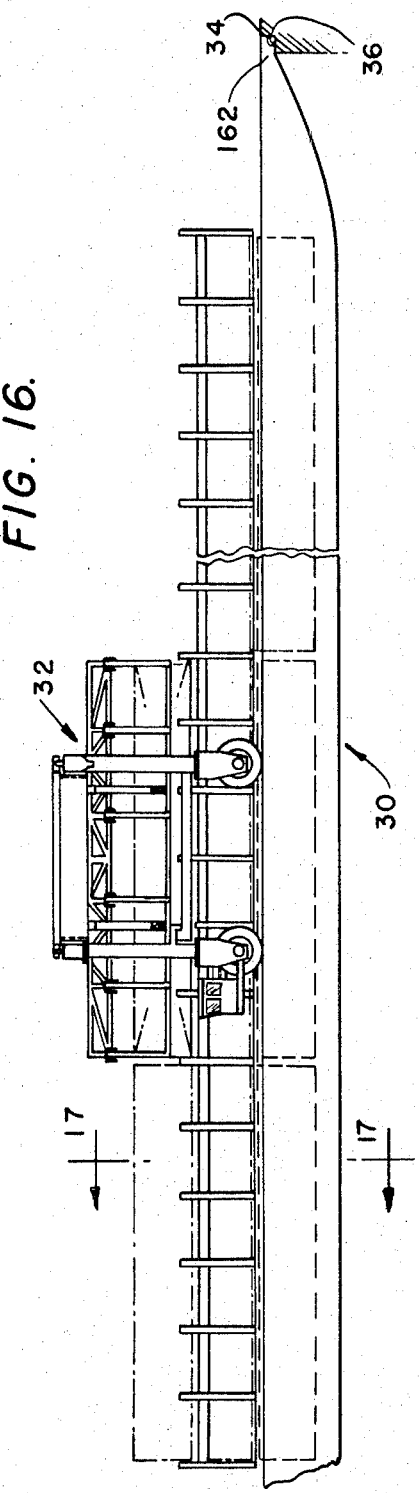
FIG. 15.
FIG. 16.

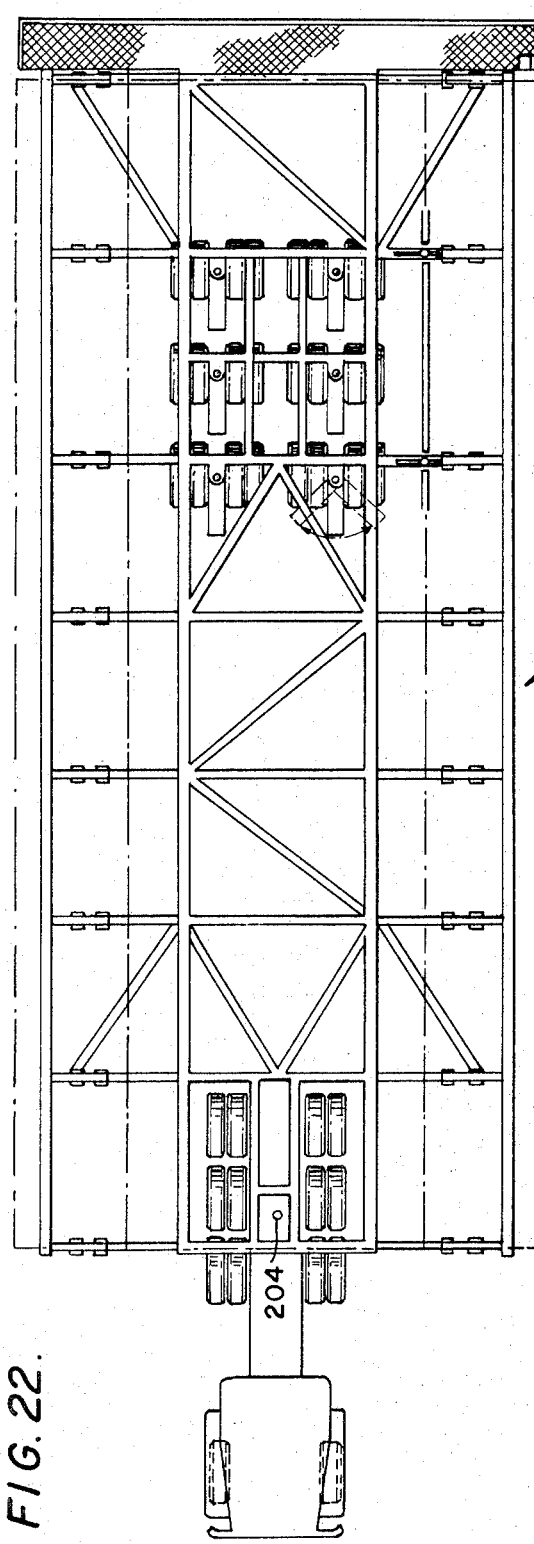
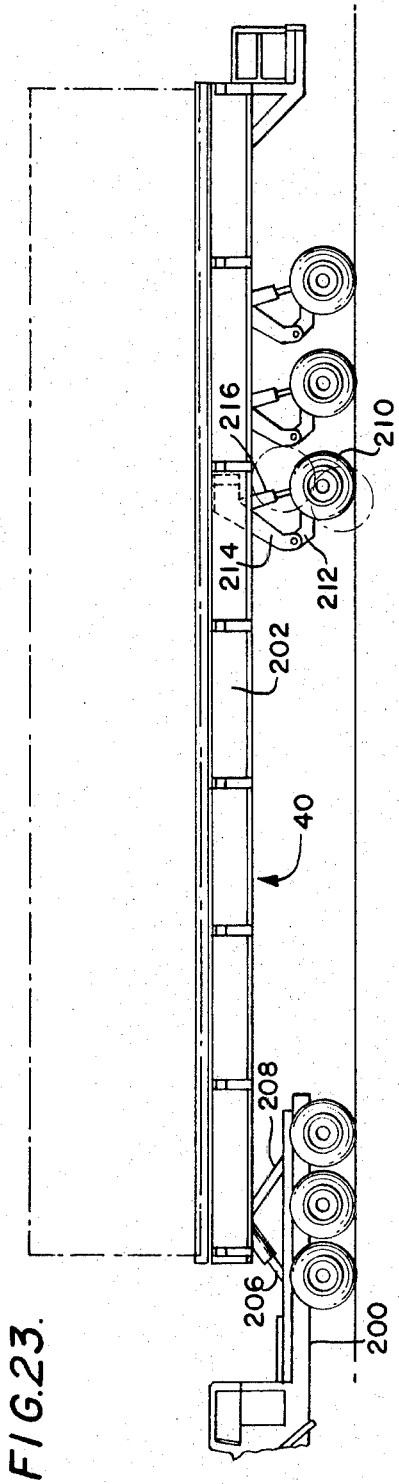
FIG. 22.
FIG. 23.

APPARATUS FOR TRANSPORTING FACTORY CONSTRUCTED HOUSING UNITS

CROSS-REFERENCE TO RELATED APPLICATION

This is a division of application Ser. No. 163,935 filed July 19, 1971.

BACKGROUND OF THE INVENTION

This invention relates to a system for building and transporting housing units. More particularly, it concerns a method and apparatus by which factory-built integral housing units, each provided with completely finished, mechanically operable, interior living space, are transported over water and/or land to a building site located many miles from the factory and transferred to permanent site foundations in the development of residential real estate.

In recent years, home builders have turned more and more to the use of factory-built or pre-fabricated structural components which can be transported for final assembly and finishing at remotely located peranent building sites. The reasons for this trend in home building, though numerous, are oriented largely to reducing the costs of materials and labor. Although most materials conventionally used in home building are not especially expensive at their source or origin, the storage, shipment and handling operations incident to getting such materials to remotely located individual building sites increases their cost to a point where the price for materials payed by the ultimate home purchaser is many times the cost at the original source of supply. Quite obviously, much of the material handling and distribution expenses associated with conventional on-site home construction, not to mention work hold-ups and delays caused by interruptions in the distribution stage, can be eliminated by centralized material inventories available to a factory.

An even greater increment of expense is incurred as a result of the problems attendant to procurring and maintaining an adequate work force of personnel required for on-site home construction. Because of the many specialized skills required in the construction of a home, many of which are mutually exclusive by choice of labor unions, a home builder must either engage in a substantial amount of subcontracting or retain on his payroll a work force of substantial size in order to have available the many skills needed. The vast amount of tract development in this country during recent decades, in which large numbers of homes are built in individual construction projects, can be attributed in good measure to providing a home builder with a basis for maintaining a sufficient number of workers to meet the requirements for specialized skills while at the same time showing a margin of profit. Even in large tract developments, however, such unpredictable factors as weather and work stoppages resulting therefrom contribute to added expense to on-site construction.

Although factory pre-fabrication of such readily transported building components as roof trusses, wall units, preassembled window and door units and the like have been widely accepted by the home building industry, the aforementioned problems associated with on-site construction have led to increased employment of factory pre-fabrication techniques. It has become conventional practice, for example, to build at a factory substantially complete housing modules which are in reality pieces or sections of a complete home or dwelling unit except in cases of units having less than approximately 900 sq. ft. of single floor area. Modules of this type are then shipped over land by truck or railway to remotely located building sites at which two or more such modules are assembled on a foundation to provide the complete housing unit. In this way, the handling and distribution costs normally incurred are reduced by building material inventories at the factory site and moreover, it is possible to maintain steady or continuous employment for construction laborers as well as increased specialization of skills with more efficiency and savings of labor cost to the builder.

A major difficulty with factory pre-fabricated modules of the type heretofore used, however, lies in the architectural restraints imposed by the size and shape of modules which can be transported by land systems of transportation. Specifically, the maximum width of module which can be transported by rail or highway is in the range of 10 to 14 ft. depending on local regulations. Where two such units are placed side by side in the finished home, as is most often the case, the maximum width of the home is only 24 ft. Hence, larger sizes of homes constructed in this manner tend to be long and narrow in relation to conventionally constructed homes of like size with the result that rooms on opposite sides of a corridor extending longitudinally of the house, for example, tend to be narrower than desirable. Though obviously, more than two such modules might be used in each house to circumvent this problem, either architectural design of the resulting house suffers from the use of 12 ft. (for example) modular increments or module sizes commensurate with less than maximum use of the transportation facility are required. Also, the added on-site labor required in the assembly of two, three or more modules detracts significantly from the economic rationale for factory prefabrication and thus becomes less than favored practice.

Another problem with land transportation of modular units is brought about by the physical abuse inflicted on the modules during transportation at normal railway or highway speeds in the range of 30 to 50 m.p.h. of necessity in order to stay within the existing stream of traffic. To overcome this problem, either specialized construction materials and/or techniques must be employed or a substantial amount of finishing and repair must be carried out at the final site. Though specialized construction can satisfy the functional requirements for housing modules, much of the aesthetic qualities sought after by the prospective home buyer lie in the warmth and security of traditional building materials and construction techniques. Inasmuch as a home represents the largest single purchase of most families, such aesthetic qualities must be provided if the house is to be sold under normal economic criteria. Because the modular approach to factory pre-fabricated home building has been unable to meet the aesthetic or architectural standards of homes built on site, some of the homes constructed from modules have been aesthetically adequate for the low-cost housing market but have not been accepted in the market for moderate and higher priced homes.

It is apparent therefore, that major strides have been made by the building industry in meeting the spiraling costs of on-site home construction by turning more and more to the use of factory pre-fabricated components and modular units. It is equally apparent, however, that there exists in the industry a need for a more complete use of factory pre-fabrication of complete housing units by which the amount of on-site construction and finishing operations is even further reduced without sacrifice of aesthetics and sound architectural design.

SUMMARY OF THE PRESENT INVENTION

In accordance with the present invention, there is provided a fully coordinated transportation and handling system by which factory-built housing units, completely finished and providing mechanically operable interior living spaces ranging in size to a maximum floor area in excess of 4,000 sq. ft., may be transported by marine vessels such as barges by way of either or both of available sea and inland waterways and then transferred by special land vehicle to permanent site foundations for completion of exterior appendages, roofs and trim. The housing units, though factory-built, are constructed entirely from conventional building materials to provide a conventional organization of structural components primarily to satisfy the aesthetic appeal and warmth of tradition. In an overall operation context, the invention contemplates successive factory, shipping and project phases during which the housing units are at all times handled or carried by structural devices capable of supplying to the housing units substantially the same measure of structural integrity conventionally supplied by a permanent site foundation. Hence, a complete cycle of construction, transportation and site placement may be achieved without damage to interior finishes on such conventional construction materials as plaster, dry walls, and the like. In the transportation phase of the overall system and where a combination of sea-going and inland waterways barges are required, a sea-going barge is loaded from a dock in the proximity of the factory using either a dock crane or a barge crane equipped with a spreader lift mechanism designed to supply a foundation-like support to each housing unit and cooperable with hold cell structures within the barge to facilitate placement of the housing units therein in accordance with a preestablished placement scheme. The sea-going barge crane is employed to unload the housing units from the sea-going barge for placement at a project destination dock site or in smaller inland waterway or river barges again using the spreader lift on the sea-going barge crane.

Upon reaching a project docking facility, the river barges are docked by ballasting at least one end thereof on a stable structure whereby a crane-like straddle vehicle, again equipped with the spreader lift structure, removes the housing units from the river barge for placement at the project docking terminal. The units are transported from the terminal directly to individual site foundations on low surface reaction land vehicles or truck-like transporters using roadways between the dock and the project as well as preconstructed project streets. After placement on the site foundations, exterior appendages such as garages, porches and the like are added, as are roofs and other special exterior trim projections in excess of 6 inches. The placement of roofs and exterior appendages at the project site both facilitates the shipping phase of the system and, more significantly, enables the exterior architecture of the house to be varied as desired to achieve an aesthetically pleasing project development.

Among the objects of the present invention are therefore: the provision of a unique, coordinated system for the construction, transportation, and placement of housing units having completely finished and mechanically operable interior living space; the provision of an improved method and apparatus by which the aforementioned interiorly finished housing units may be handled effectively during transfer and transporting operations incident to moving the units from the factory to a remotely located building project without damage to the units; the provision of such a method and apparatus by which maximum efficiency of transporting equipment may be achieved; the provision of a method and apparatus of the type referred to enabling maximum employment of factory pre-fabrication construction techniques without in any way sacrificing architectural design in either the housing units individually or in the architectural design and aesthetic appearance of an overall housing development or project; the provision of an improved marine system for shipping housing units of the type referred to as well as other large cargo units having similar characteristics; and the provision of novel, structurally coordinated handling and transporting components for housing units of the type referred to.

Other objects and further scope of applicability of the present invention will become apparent from the detailed description to follow taken in conjunction with the accompanying drawings.

BRIEF DESCRIPTION OF THE DRAWINGS

FIGS. 1A through 1D are schematic illustrations providing a flow sheet of the overall operation contemplated by the present invention;

FIG. 4 is a side elevation, partially in section, illustrating the sea-going barge forming part of the present invention;

FIG. 8 is a plan view of one embodiment of a spreader lift used in handling the housing units during barge loading and unloading operations;

FIG. 9 is a side elevation of the spreader lift shown in FIG. 8;

FIG. 15 is a fragmentary plan view illustrating an inland waterway or river barge of the present invention;

FIG. 16 is a side elevation of a river barge shown in FIG. 15;

FIG. 20 is a fragmentary plan view illustrating the project barge terminal in accordance with the invention;

FIG. 22 is a plan view showing a special transporter by which the housing units are transported from the barge terminal to the individual site foundations at the project;

FIG. 23 is a side elevation showing the transporter of FIG. 22;

DETAILED DESCRIPTION OF THE PREFERRED EMBODIMENTS

Figure 2:
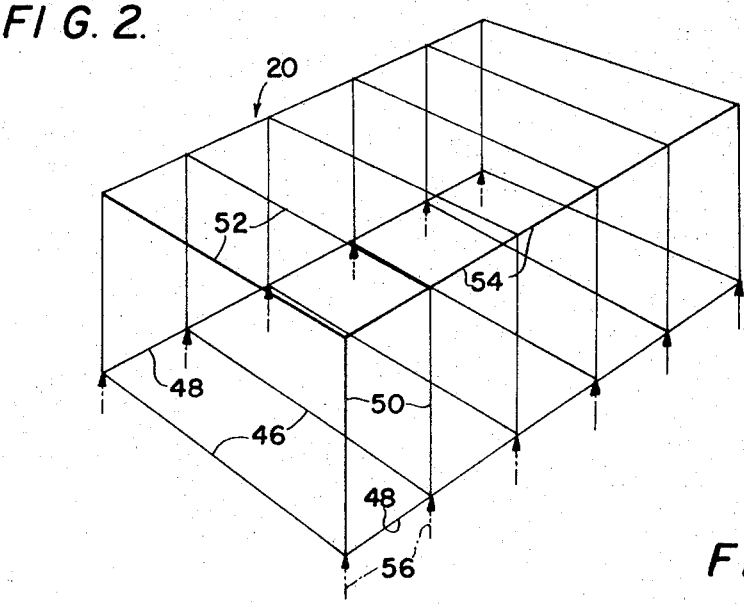
FIG. 2 is a schematic or line drawing in perspective, the lines thereof representing basic structural components in a conventional housing unit.

A general understanding of the overall operation contemplated by the practice of the present invention may be had by reference to FIG. 1A through FIG. 1D of the drawings. Basically, the overall operation is logically separated into a factory phase depicted by FIG. 1A; a shipment phase depicted FIG. 1B; and a project phase depicted by FIGS. 1C and 1D. During the factory phase and as suggested by the legends employed in FIG. 1A, a continuous manuracturing cycle is completed under a roof generally designated by the reference numeral 10 by assembling a floor unit 11 on a suitable movable carriage such as a dolly 12 initially positioned on the extreme left end of the factory as depicted by FIG. 1A. Thereafter, the floor unit 11 and the dolly 12 are advanced through successive stations under the roof 10, at which stations various components of the complete mechanically operable housing unit are placed on the floor supported by the dolly. As illustrated, completion of the floor is followed by the placement thereon of complete kitchen and bath modules 14 and 16 and then by the assembly of interior and exterior walls. Also, though not shown in the drawing, heating and airconditioning installation will be made at this time. Thereafter, a completely finished ceiling unit is placed over the interior and exterior walls and secured in place to complete the basic structural organization of the housing unit. In accordance with the invention, all interior walls, as well as interior ceiling surfaces will be completely finished and painted during the manufacturing phase. Also, conventional materials will be used throughout. Hence, following the assembly of the ceiling with the interior walls it will be appreciated that the corner joints which result between the ceiling and the walls, each of which in themselves having been previously finished, will have to be touched up such as by joint taping in the event conventional gypsum board or dry wall paneling is employed. After such touch-up operations, the interior of the housing unit is completed by placement of carpeting, draperies, fixtures and other such interior trim as might be expected in a conventional home interior.

The completed mechanically operable interiorly finished housing unit, designated in the drawings by the reference numeral 20, is packaged with a water impervious wrapping of appropriate weather resistant sheet material to complete the factory phase. It will be noted that the housing unit 20 at this time, though completely finished interiorly, is without a roof structure or exterior appendages such as garages, porches and the like. The omission of the roof structure and exterior appendages at this phase of the overall operation has the apparent advantage of facilitating shipment of the housing units. In addition, however, it provides a very significant architectural advantage in achieving desired exterior appearance of the ultimate house in its final position. In other words, though each of the housing units is of cubic configuration at the factory, a wide variety of diverse exterior designs may be effected by the selection of the particular roof and exterior appendages to be added at the project phase of operations. It is further noted at this point that the housing units 20 are depicted in FIGS. 1A–1D as single story units. As will be apparent from the more detailed description of the transporting and handling components of the overall system, the invention contemplates the factory prefabrication, shipping and project placement of two-story units having an overall height approximating twice that of a single story unit. Also, several variations in length of the units 20 are contemplated. Thus, the facility offered by the present invention for providing a wide range of sizes and interior designs of completely integrated housing units will be appreciated. To maximize efficiency in the shipping and project phases, however, a uniform width of the housing units 20 will be retained. In the practice of the present invention, a common width of 30 feet has been found desirable principally from the standpoint of providing required facility for architectural planning of the housing interior.

In the shipment phase of the present invention, either one or both of a combination of sea and river or inland shipping waterways will be used. Hence, and where the factory phase and the project phase are separated by sea lanes, the housing units 20, after having been packaged at the factory 10, are transferred from the factory dolly 12 to an ocean or sea-going barge 22 either by a wharf crane 24 or by a barge crane 26 each equipped with a spreader lift 28 to be described in more detail below. Also in a manner which will become more apparent from the description to follow, the sea-going barge 22 is equipped with means (not shown in FIG. 1B) for supporting the housing units one above the other in tiers.

Following ocean shipment, the housing units 20 are transferred, using the sea-going barge crane 26, to one or more river barges 30 equipped in the embodiment shown, with a wheeled carrier 32 having a spreader lift unit 28a. Although use of both the sea-going barge 22 and one or more river barges 30 is essential to shipment of the housing units 20 where ocean waterways are involved, it is contemplated that the shipment phase may be carried out using only the river barges 30 in situations where the factory is located on an inland waterway or a river on which access may be had to the location of the project.

Upon completion of the shipment phase of the operations with arrival of the river barges at the project site, the project phase of operation is initiated by unloading the river barges 30. The preferred techniques for unloading the river barges 30, as depicted schematically in FIG. 1C of the drawings is to align the barge 30 with a dock ramp 34 having a bow support ledge 36 on which bow extensions of the river barge 30 may be supported firmly by appropriate ballasting of the barge. The housing units 20 are then lifted by the spreader lift 28b on the barge carrier 32 and the carrier advanced along the length of the barge onto the dock ramp 34 to a project terminal 38 in the vicinity of the dock ramp 34. At the project terminal 38 the housing units 20 are temporarily stored. From the terminal 38, the housing units are transported individually by truck transporters 40 along project streets to the individual project lots on which the housing units are to be placed, such lots having been previously prepared and provided with permanent foundations 42 as shown in FIG. 1D. A project crane 44, also equipped with a spreader lift 28c, transfers the housing units 20 from the transporter 40 directly to the foundations 42. As depicted in FIG. 1D, the housing units are completed by the assembly of roofs, garages, or other external appendages such as porches or the like. Also at this time final large units of exterior trim are applied as well as exterior fireplaces and the like.

To provide a clearer understanding of the method and apparatus of the present invention, particularly during the shipping and project phases of the over operation described above, consideration will be given first to the structural characteristics of the housing units 20 and the conditions which must be met during shipping and handling while maintaining the interiors of the units in the condition to which they were finished at factory 10. In FIG. 2, the basic structural components of the housing units 20, using conventional wood frame construction, are depicted by lines representing floor joists 46, joist end plates 48, wall studs 50, ceiling joists 52, and wall stud caps 54. Though obviously, each of the housing units 20 include such additional structural components as interior walls which will supply a measure of strength in the completed unit, variation in interior design between units limits meaningful analysis of structural integrity to the basic components represented by the lines illustrated in FIG. 2 of the drawings. In this context, it will be seen that the unit 20 possesses structural integrity only in substantially discrete transverse sections established primarily by the floor joists 46 inasmuch as the other components such as wall studs, ceiling joists and the like are ultimately carried by the joists 46. Also, it will be appreciated that if interior wall finishes such as plaster and gypsum board or dry wall are to be maintained in their initial factory condition, any external stress tending to deflect the initial positional relation of the components depicted in FIG. 2 must be absorbed by these components themselves. While this latter factor is accounted for readily by proper size selection of materials from which the respective components are formed, it is apparent that the interrelation of the structural members will not be maintained unless and adequate foundation-like support is provided to retain the initial planar orientation of the floor joists 46 within accepted deflection tolerances. As an example, Universal Building Code requirements for structural foundations limit joist deflection to 1/360 of span. The foundation support for the unit 20 is depicted in FIG. 2 by arrows 56. In other words, the nature of the structural components in the unit 20 are such that non-deflecting vertically oriented points of support must be provided on the opposite ends of each joist 46 if the initial planar orientation of the floor joists is to be maintained.

Figure 3A:
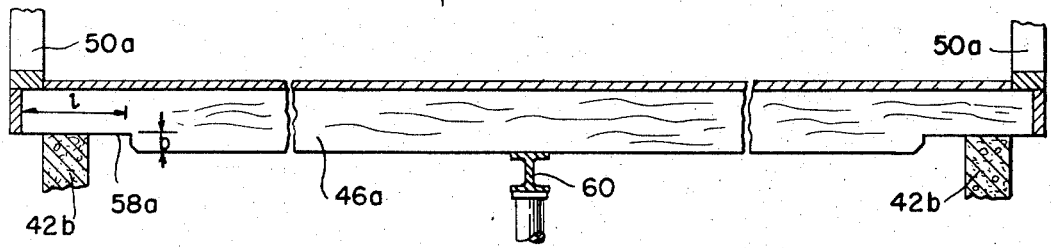
FIGS. 3A through 3C are sectional views showing alternative forms of typical floor and foundation arrangements for the housing units to be constructed, transported and placed in accordance with the present invention.

In FIG. 3A of the drawings, a transverse section through the lower portion of the unit is shown and illustrating the preferred configuration of a wood joist contemplated for the housing units 20 in accordance with the invention where conventional wood frame construction is employed. As shown in FIG. 3, the joists 46a span the entire width of each of the units and are provided with notches 58a at opposite ends having a length $l$ and a depth $d$. The notches 58a are provided to facilitate handling of the units during the shipping and project phases of the overall operation described above and also to provide at the ends of each joist, an overall depth corresponding to that which would be conventional were the housing units erected on the foundation 42a in normal fashion. The added depth of the joist represented by the dimension $d$, enables the joist to withstand interior floor loading of the unit while the latter is supported only at opposite ends. The permanent foundation 42a, having a central supporting beam 60, will accommodate the additional live interior loadings which may occur when the unit is occupied and in a manner to provide an exceptionally strong and rigid floor.

Figure 3B:
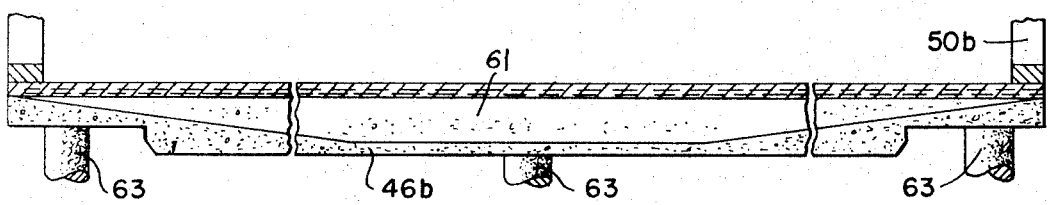
Figure 3C:
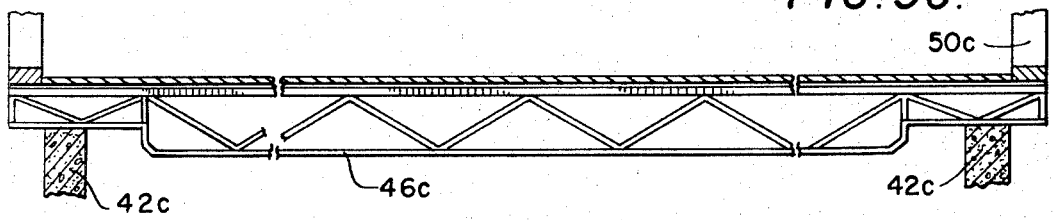

In FIGS. 3B and 3C of the drawings, alternative forms of floor structures contemplated for the housing units are shown. Thus in FIG. 3, a concrete slab 61 having T-joist sections 46b reinforced by rods 62 is provided. In this instance the foundation 42 on the lot site is replaced with pedestals 63 spaced at appropriate increments over the area of the floor as needed to support the slab 61. In FIG. 3C, steel truss units 46c are substituted for the wooden joists 46a in the embodiment of FIG. 3A. Thus it will be seen that the system of the present invention lends itself to a variety of conventional construction materials and techniques.

In light of the foregoing discussion of FIGS. 2 and 3 of the drawings, it will be appreciated that during the shipping and project phases of the operation in which the method and apparatus of the present invention are employed, the coplanar orientation of the joists 46 must be maintained.

An understanding of the sea-going or ocean barge 22 and the manner in which the housing units 20 are loaded, stowed and unloaded using either the dock crane 24 or the barge crane 26 equipped with the spreader lift 28, may be had by FIGS. 4–14 of the drawings. As shown in FIG. 4, the barge 22 is formed with a sea-going hull having a bow section 70, a midship section 72 at a bifurcated stern section 74 adapted for trunnion connection to a pusher tugboat 76. The trunnion interconnection of the tugboat 76 with the stern of the barge 22 is effected in a manner disclosed fully in U.S. Pat. No. 3,512,495 issued on May 19, 1970 to Edwin H. Fletcher. Athough the size of the barge 22 may vary, the contemplated size of the barge to be used in accordance with the present invention, is approximately 690 feet in length, the midship section having four longitudinally adjacent holes having port and starboard cells 75, each cell being approximately 144 feet long, 34 feet wide and 80 feet deep, the depth of the cells being established by a combination of the hull structure and deck coaming 77. Operation of the tugboat 76 as well as a bow thruster 78 to facilitate steerage may be controlled from the pilot house 80 on the deck of the bow section 70.

Figure 5:
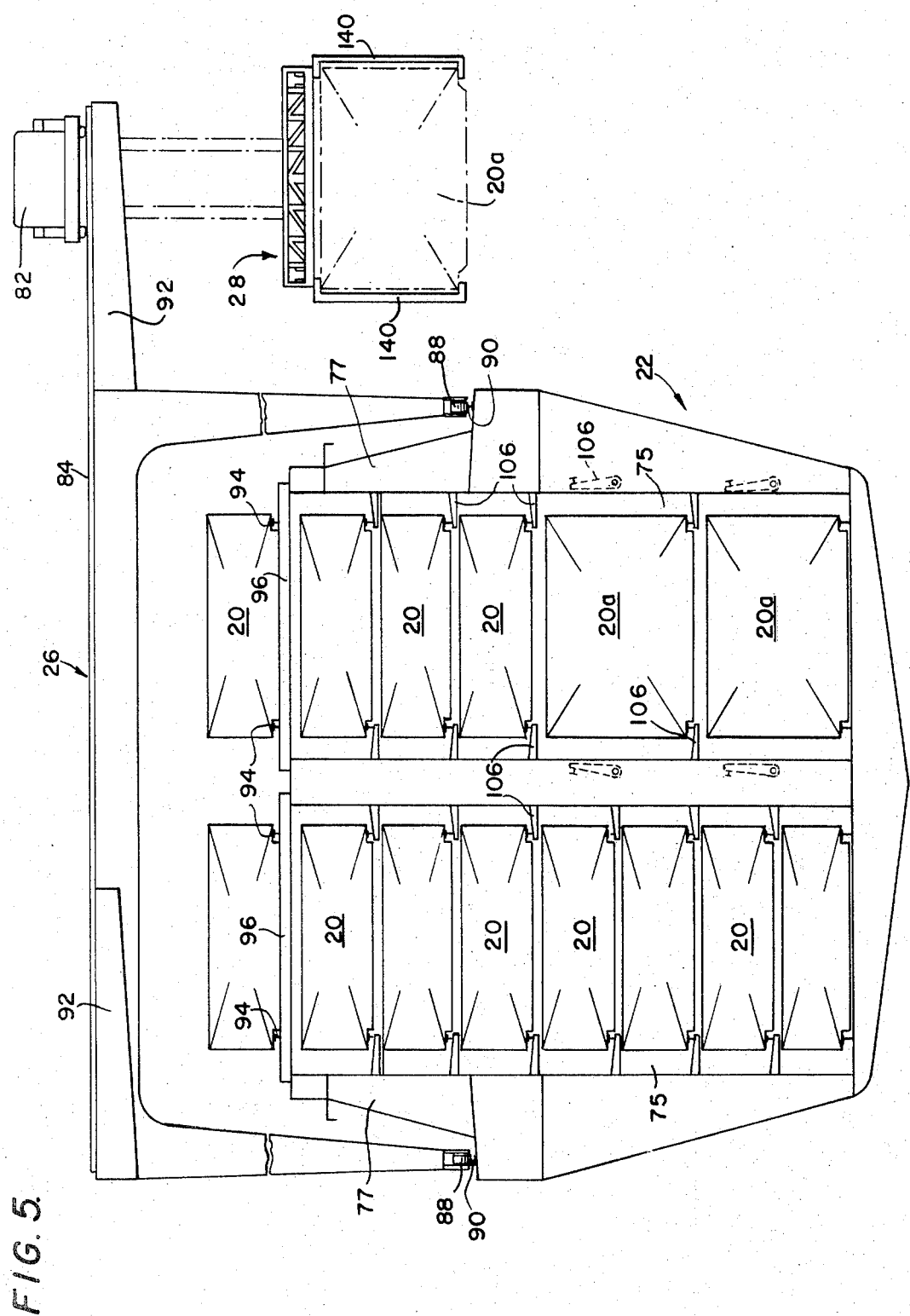
FIG. 5 is a transverse section through the barge illustrated in FIG. 4.

The barge crane 26 is a transporter-type crane having an overhead trolley 82 movable laterally on tracks 84 carried by a transporter 86 having traveling wheels 88 movable along tracks 90 extending the length of the midship section 72 and located at the outboard edges of the midship section deck. As shown in FIG. 5, the crane 26 is provided with foldable or rectractable outrigger boom sections 92 which may be retracted during barge travel and extended to facilitate transfer to the river barges 30 or loading operations, if desired, directly from a dock in installations where the dock crane 24 is not available.

Figure 6:
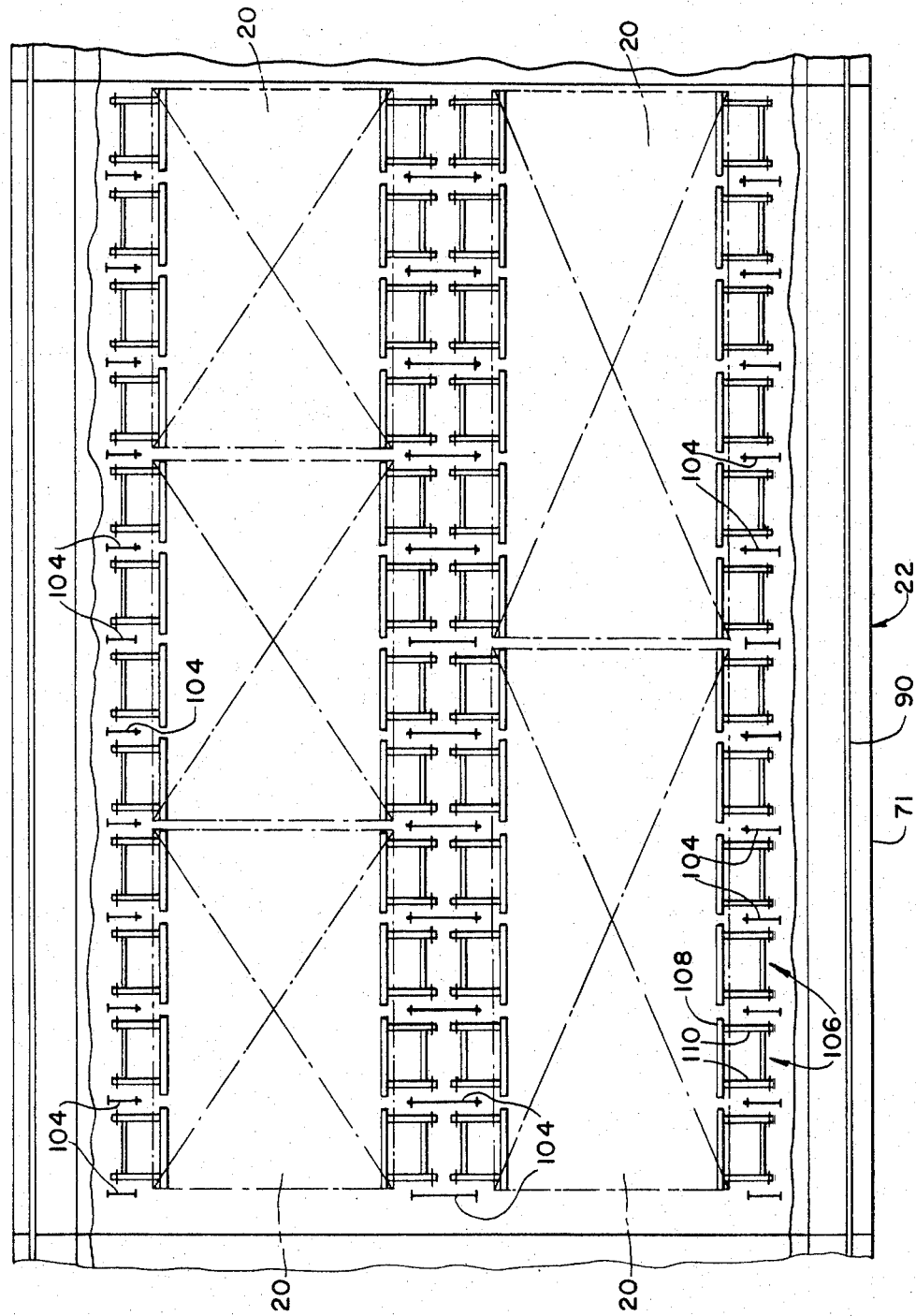
FIG. 6 is an enlarged fragmentary plan view partially cut away and showing the hold cell organization of the barge shown in FIG. 4.
Figure 7:
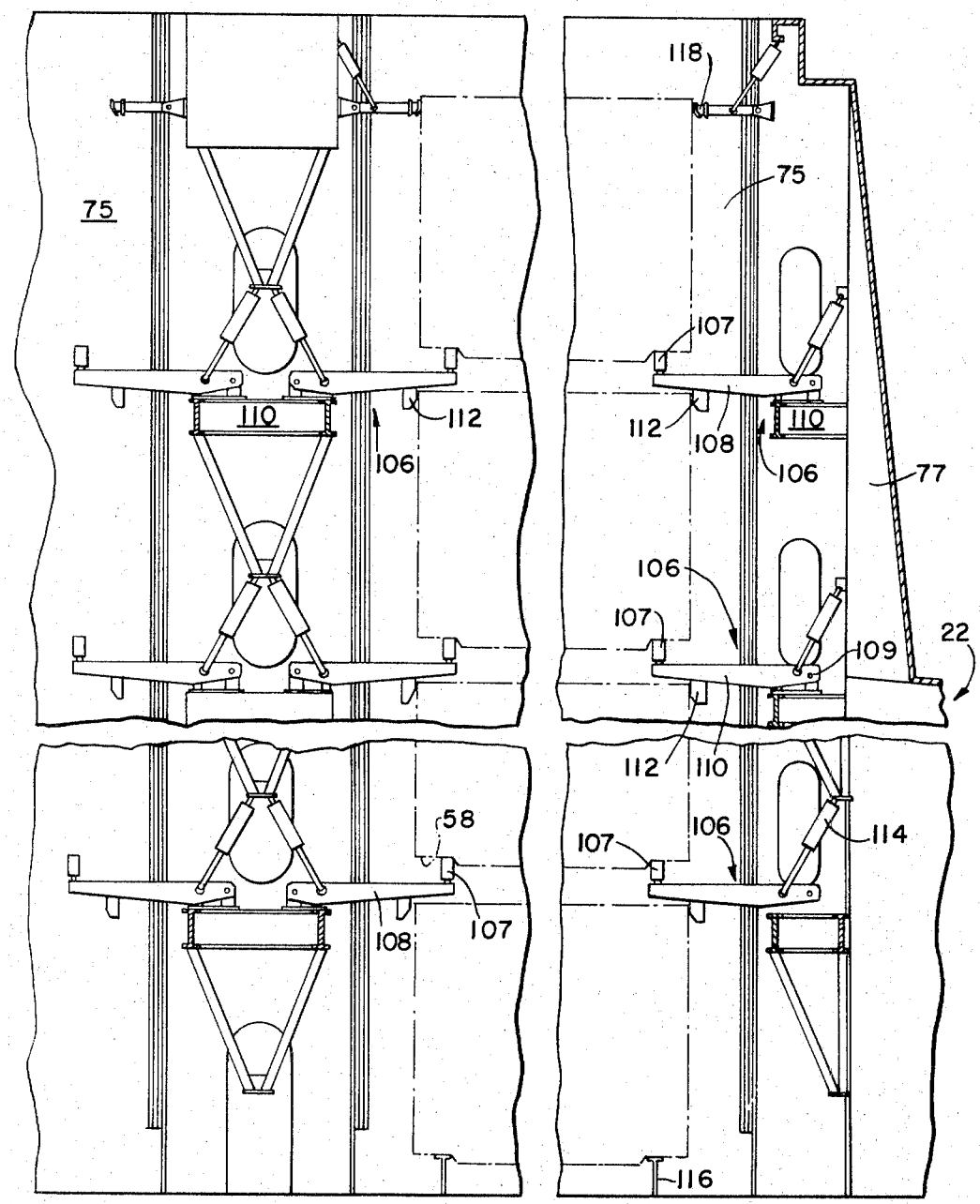
FIG. 7 is an enlarged fragmentary cross-section showing the housing unit support structure within the hold cells of the barge illustrated in FIG. 4.
Figure 10:
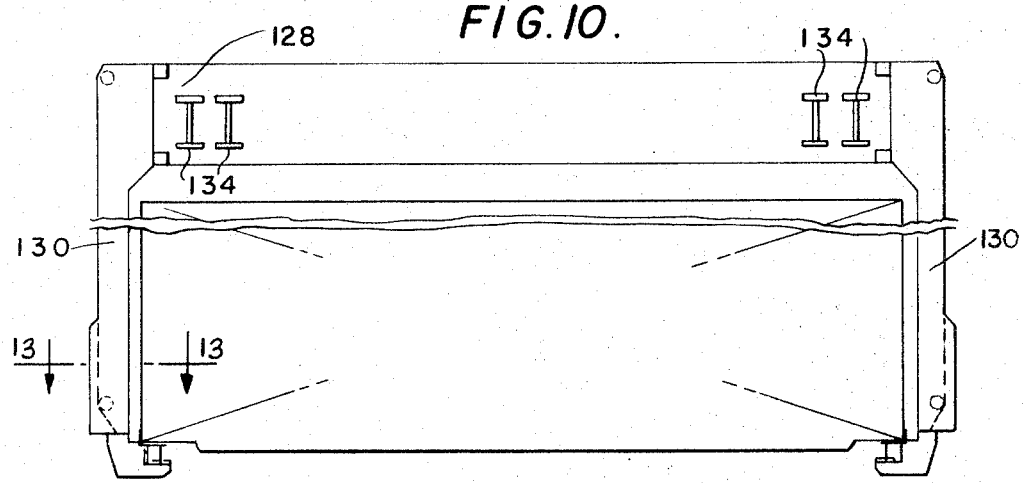
FIG. 10 is a cross-section taken on line 10—10 of FIG. 9.

Referring now to FIGS. 5–7 of the drawings, it will be seen that each of the hold cells 75 is equipped for stowage of the housing units in multiple tiers or levels and in a manner such that each housing unit is fully and independently carried on a foundation-like support means. In addition, a further tier of units are deck stowed and supported in similar fashion by a pair of parallel rails 94 extending longitudinally on the upper surface of a removable hatch cover 96 for each of the hold cells 75.

The structure by which the housing units are supported independently in multiple tiers within the hold cells 75 is most clearly illustrated in FIGS. 6 and 7 of the drawings. It will be seen from these figures that the maximum free space across the width of each of the cells 75 is established by flanged columns 104 spaced at even increments along the length of the barge midship section 72. The columns 104, as shown most clearly in FIG. 7, form part of the barge hold structure and extend vertically from the bottom of the hold cells 75 to the upper portion of the deck coaming 77. Also it will be noted that the columns on opposite sides of each hold cell are provided with the same amount of incremental spacing so as to be transversely aligned in pairs. Situated between each two of the columns 104 on opposite sides of each cell 75 are a plurality of vertically spaced, hydraulically actuated pivotal supports 106 each having a longitudinally disposed supporting rail or beam 107 carried on the inboard ends of a pair of arms 108. As shown most clearly in FIG. 7, the arms are pivoted at their outboard ends to pintles 109 carried by girders 110 spanning the columns 104. When extended to their load carrying position, the arms project into the cell 76 in cantilever fashion, being supported by the pintles 109 and girders 110 extending between the columns 104. When thus extended, the cell supporting units 106 provide a rigid extension of the hull structure into the stowage cells and establish a continuous foundation-like support under the floor joists of the housing units 20 at the notches 58 described above with respect to FIG. 3 of the drawings. Also as shown in FIG. 7, additional lateral support for the housing units is supplied by chock members 112 on the underside of the arms 108. It would be appreciated therefore that each housing unit situated in the hold cells 75 between vertically spaced sets of the supports 106 will be provided with a foundation-like support as a result of the rails 107 extending longitudinally on opposite sides thereof and moreover, that lateral support is provided not only as a result of the positioning of the rails 107 at the inner ends of the notches 58 in the floor joists or equivalent but also such lateral support is provided at the upper end of each housing unit by the chocks 112. The supports 106 are adapted to be moved to a retracted position by hydraulic units 114 operated in response to a centrally located control unit (not shown).

Inasmuch as the support means for the lowermost tier of housing units in each of the hold cells need not be retractable, support for this tier is provided by a pair of rails or beams 116 fixed on the floor or bottom of each hold cell 75. Also as shown in FIG. 7, the uppermost tier of housing units within each hold cell 75 is engaged by pivotal chocks 118 supported by the columns 104 and serving the same function as the chocks 112 depending from the arms 110 on the supports 106.

Figure 11:
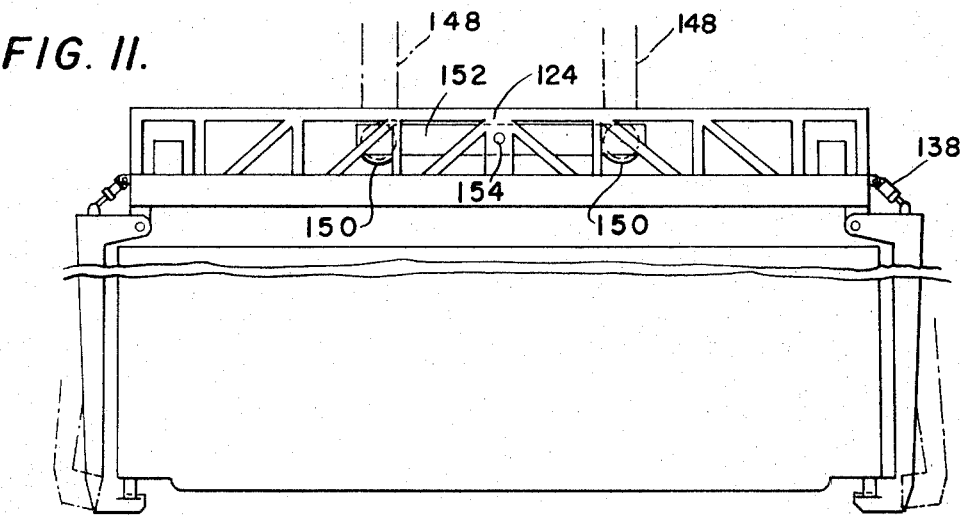
FIG. 11 is an end view of the spreader lift illustrated in FIGS. 8 and 9.
Figure 12:
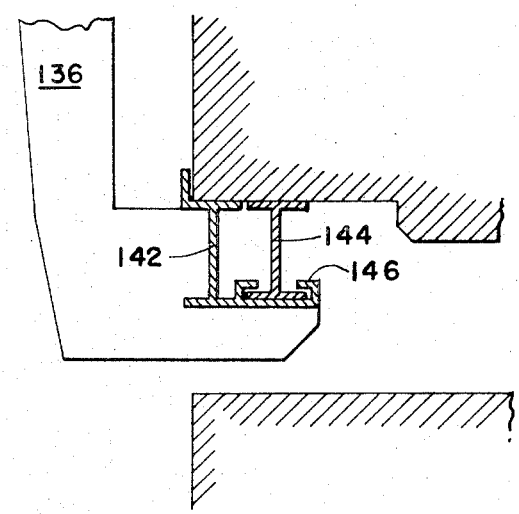
FIG. 12 is an enlarged fragmentary cross-section taken on line 12—12 of FIG. 9.

The structure of the spreader lift 28 carried by the trolley 82 of the barge crane 26 and by which a similar foundation-like support is effected during handling of the housing units 20, as in loading and unloading the barge 22, as well as the manner in which the spreader lift structure cooperates with the hold cell defining structure in the barge, is most clearly illustrated in FIGS. 8–13 of the drawings. As shown in FIGS. 8, 9 and 11, the spreader lift 28 includes a superstructure defined by a main frame 120 established by side trusses 122 connected in box fashion by end trusses 124. The structure of the main frame 120 also includes a central box beam 126 as well as a pair of guide frame beams 128 each having a pair of vertical guide arms 130 depending at opposite ends thereof. The beams 126 and 128 are connected to each other and to the side and end trusses by a network of struts 131 to establish in the main frame 120 a strong rigid structure capable of carrying the largest housing unit 20 to be transported without deflection, irrespective of variations in load locations within the unit. A similar measure of rigidity is carried into a pair of extensible frame sections 132 supported from the main frame 120 by beams 134 supported in cantilever fashion by guideways provided in the end trusses 124 and also in the central box beam 126 as shown most clearly in FIG. 8. Pivotally supported from the side trusses 122 of the main frame are four support arms 136 adapted to be moved between extended and lifting positions by hydraulic piston-cylinder units 138 as shown in FIG. 11. A pair of additional support arms 140, because of the adjustability of the extensible frames 132, can be adjustably positioned to several positions as suggested by the phanton lines in FIG. 9. The support arms 136 carry at their lower ends a continuous support beam 142 extending the length of the frame 120. As shown in FIG. 12, a similar beam 144 is slidably received in an undercut guideway 146 provided in the support arms 136 to effect a continuation of the beam 142 to the arms 140 carried by the extensible frame sections 132.

Figure 13:
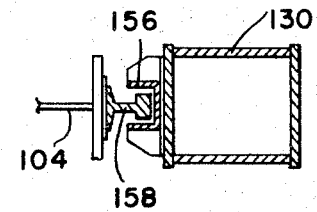
FIG. 13 is an enlarged fragmentary cross-section taken on line 13—13 of FIG. 10.
Figure 14:
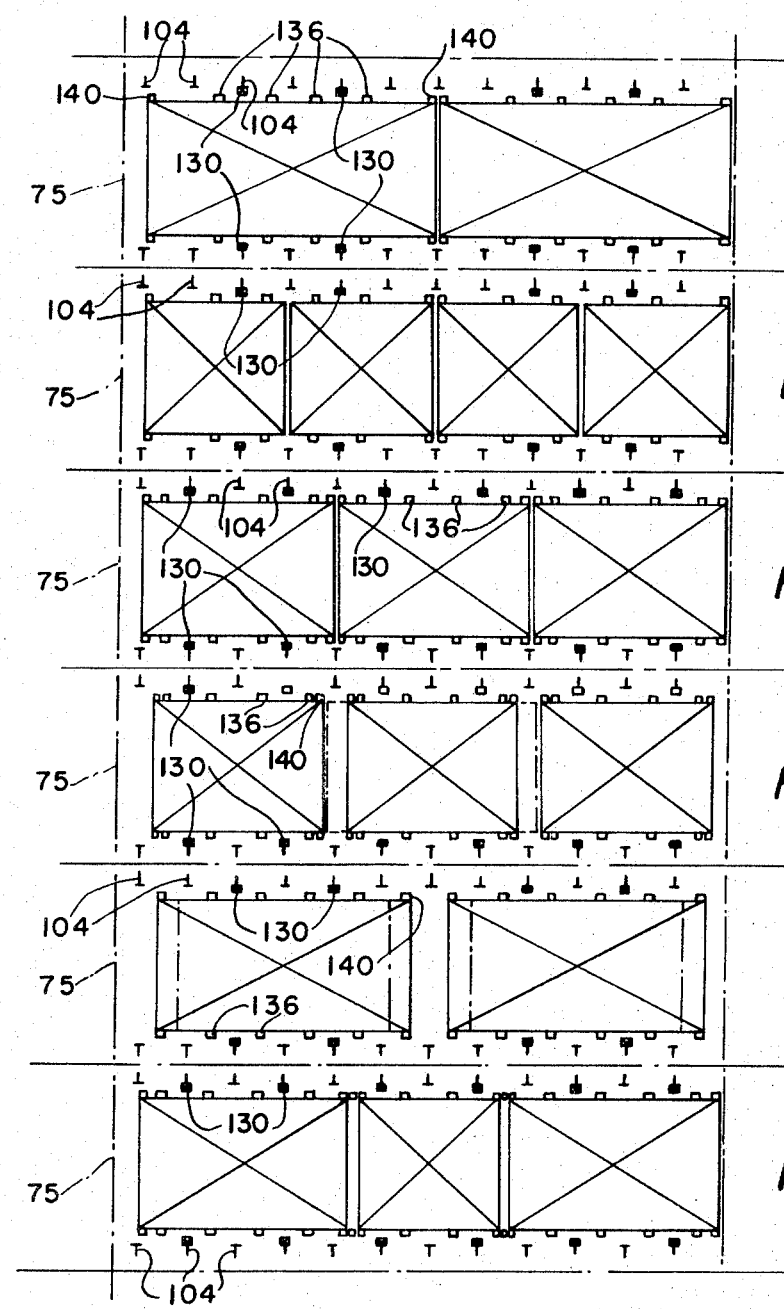
FIGS. 14A–14F are schematic plan views illustrating the various loading schemes for the hold cells in the sea-going barge of FIG. 4.

Connection of the spreader lift 28 to the trolley 82 of the barge crane 146 is effected by four cable runs 148 about sheaves 150 supported at or near the ends of a list assembly in the form of a beam 152 pivotally connected by a pin 154 to each of the end trusses 124 as may be seen by reference to FIGS. 9 and 12 of the drawings. Although such list assemblies are conventional, variations in length between the four supporting cables 148 can be accommodated without stressing the superstructure of the lift spreader by allowing the beam 152 at one end of the spreader to pivot freely while braking the pivotal connection of the beam at the other end, thereby to effect a three-point support of the spreader lift. As shown in FIGS. 9 and 13 of the drawings, the guide arms 130 depending on opposite sides of the spreader are formed with outwardly opening channel-shaped guideways 156 to engage guiderails 158 secured to the inner flange of the columns 104 establishing the interior dimensions of the hold cells 75 in the barge 22. By virtue of this arrangement, once the spreader 28 is received in the hold cell, relative lateral movement between the hold cell and the spreader lift is prevented. Hence, the spreader can be advanced outwardly over a housing unit with the support arms moved to their extended position and advanced under the housing unit carried by the cell supports 110 either to place or lift the respective housing units to or from the stowed position in the barge.

An important aspect of the present invention is the provision of a transportation system by which diverse sizes of the housing units may be handled and transported efficiently. As will be appreciated from the foregoing description of the housing unit support structure within the hold cell 75 of the sea-going barge 22, as well as the construction of the spreader lift, most efficient use of the structural units is achieved where the width or joist span of each of the housing units is maintained the same. Though it is contemplated that housing units of less width might be transported using the same equipment, this would entail the use of dummy extensions of floor joists, for example, at the factory, such extensions to be cut off after the unit was placed on its foundation at the project phase of the overall operation. Though the use of dummy extensions may be desirable to achieve other than rectangular floor plan configurations in the respective housing units, quite obviously such procedure is tantamount to loss of efficiency during the shipping phase. Accordingly, it is preferred that variation in the size of the housing units 20 be achieved by retaining a common width or floor joist span but varying the length and height of the respective housing units to provide needed variation in living space. Specifically, the width or joist span of each of the housing units is selected to be 30 feet. By selecting different lengths of housing units, single floor areas can be varied from approximately 1,000 sq. ft. to 2,040 sq. ft. by using lengths of from 33.5 feet to 68 feet, respectively. Increments of floor space area between these ranges are also contemplated. For example, using length increments of 40, 45, 50 and 60 feet, single floor areas of 1,200, 1,350, 1,500 and 1,800 sq. ft. can be achieved, respectively.

Obviously, the number of size variations possible in individual housing units using the above mentioned length increments can be doubled by constructing the units with two stories. The manner in which two-story units are handled in terms of both stowage on the barge 22 and during transfer by the spreader lift is depicted in FIG. 5, such two-story units being designated by the reference numeral 20a. Hence, a combination of two-story and single story housing units can be stowed in the hold cells 75 of the barge 22 simply by retracting the pivotal support members 106 at alternate levels within each cell. The spreader lift 28 in this instance is provided with support arms 140 of a length to accommodate the two-story units 20a. Apart from the added increment of height required for example in the barge crane 26 to provide clearance above the coaming 77 as well as in other handling equipment to be described, no further variation is required inasmuch as a single story unit can be handled by the same equipment.

Because of the cooperation of the spreader lift 28 with the guiderails 158 on the columns 104 in the barge 22, and the desirability for having the lift centered with respect to the housing unit to be handled, loading of diverse lengths of housing units within each of the hold cells 75 must be effected in accordance with a preestablished plan if maximum stowage efficiency of each hold cell 75 and maximum efficiency of the barge crane 26 are to be achieved. A preferred arrangement for handling housing units of varying lengths within each of the hold cells 75 is depicted schematically by FIGS. 14A–14F. In these figures, the relative location of the columns 104, guidearms 130 on the spreader lift 28, as well as the support arms 136 and 140 is shown. Hence, in FIG. 14A, one tier or level of the hold cell 75 is shown to contain two housing units 20, each being 68 feet in length. In FIG. 14B, four housing units 20, each of a length 33.5 feet are shown and adapted to be handled by the spreader lift, two at a time. Hence, in both the arrangements shown in FIGS. 14A and 14B, the extensible frames 132 on the spreader lift 28 are advanced to their most extended position as shown in FIGS. 8 and 9 of the drawings. In FIG. 14C, three 45-foot housing units 20 are whereas in FIG. 14D the positioning of three 40-foot units is shown in solid lines with an alternative of two 40-foot units in one 50-foot unit, the latter being shown in phanton lines in FIG. 14D. In FIG. 14E, the horizontal positioning of either two 60-foot housing units or two 50-foot units are illustrated respectively by solid and phantom lines. Finally, in FIG. 14F two 50-foot units and one 33 ½-foot housing units are shown. Thus, it will be seen that a wide variety of housing unit sizes may be accommodated in a very efficient manner within each of the hold cells 75.

It is also preferred that to the extent possible, the units 20 or 20a within each of the eight hold cells 75 on the sea-going barge 22 be arranged so that units of the same length are positioned in vertical alignment throughout the respective tiers. Because of the ability of the supports 106 to be retracted individually or in sets corresponding to the length of unit carried thereby, coupled with a correlation between the center spacings of the columns (i.e. 11 feet 7 inch) with the above mentioned unit length increments, it is possible for the units to be loaded and unloaded with a minimum movement of the barge crane 26 along the deck tracks 90. In other words, by loading and unloading the units in an order approaching vertical rather than horizontal succession, travelling movement of the barge crane along the deck track and attendant loss of efficiency can be minimized.

Although the carge capacity and seaworthiness of the relatively large barge 22 is essential to the overall system of the present invention where ocean or sea shipping operations are required between the factory project phases it is apparent that the sea-going barge 22, because of its size, will have limited access to project sites located along inland waterways. To facilitate accessibility to real estate located on inland waterways, therefore, it is necessary that the smaller river barges 30 be used. Also, in situations where the factory at which the housing units are constructed is located on inland waterways, the river barges alone may be used to transport the housing units from the factory to the project location.

Although the river barges 30 are generally shown in FIG. 1C, a more complete illustrative of the river barge structure is shown in FIGS. 15–19 of the drawings. As shown in FIGS. 15 and 16, the river barges 30 are formed with flat bottom hulls 160 having a pair bow extensions 162 and a deck 164 extending the length of the barge on opposite sides of a longitudinal hold 166. The cargo carrying capacity of the hold 166 is extended upwardly of the deck 164 by a series of vertical columns 168 spaced uniformly along the length of the hold 166 at increments corresponding precisely to the spacing increments between the column 104 in the hold cells 75 of the sea-going barge 22 previously described. Like the columns 104 in the sea-going barge 22, the columns 168 of the river barges 30 are provided with inwardly directed guiderails 170 for receiving the guideways 156 on the guidearms 130 of the spreader lift 28 associated with the sea-going barge frame 26. Hence, transferring the housing units 20 from the sea-going barge 22 to the river barges 30 using the spreader lift 28 is readily accomplished in operations where the sea-going barge 22 is employed. Obviously, the spreader lift 28 associated with the dock crane 24, for example, can also be used in the same manner to place the housing units 20 directly onto the river barges 30 in operations where the sea-going barge is not needed.

Figure 17:
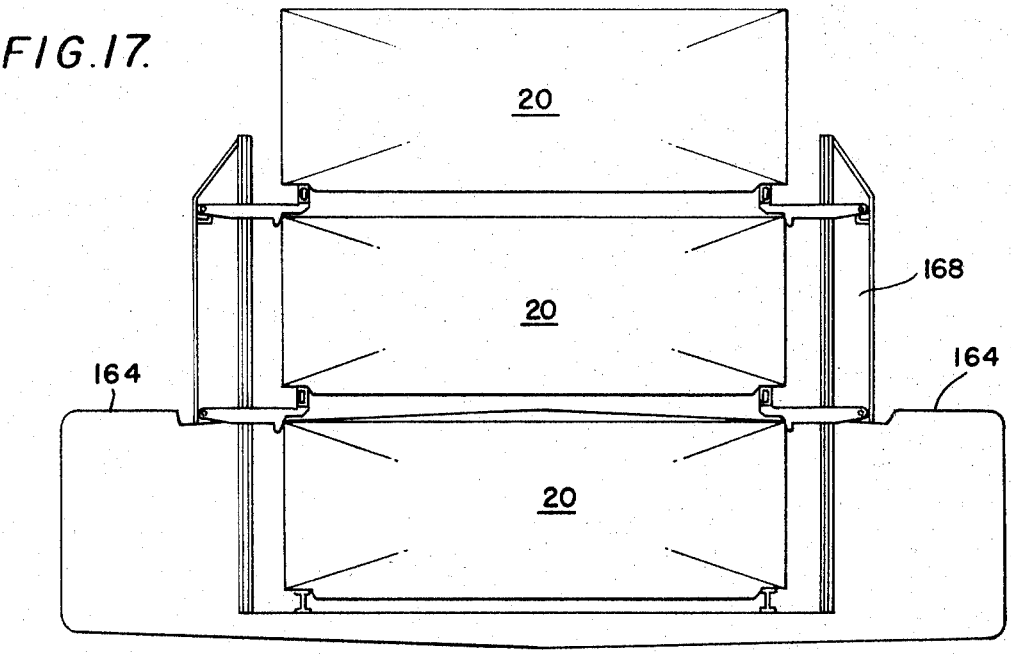
FIG. 17 is an enlarged cross-section taken on line 17—17 of FIG. 16.
Figure 18:
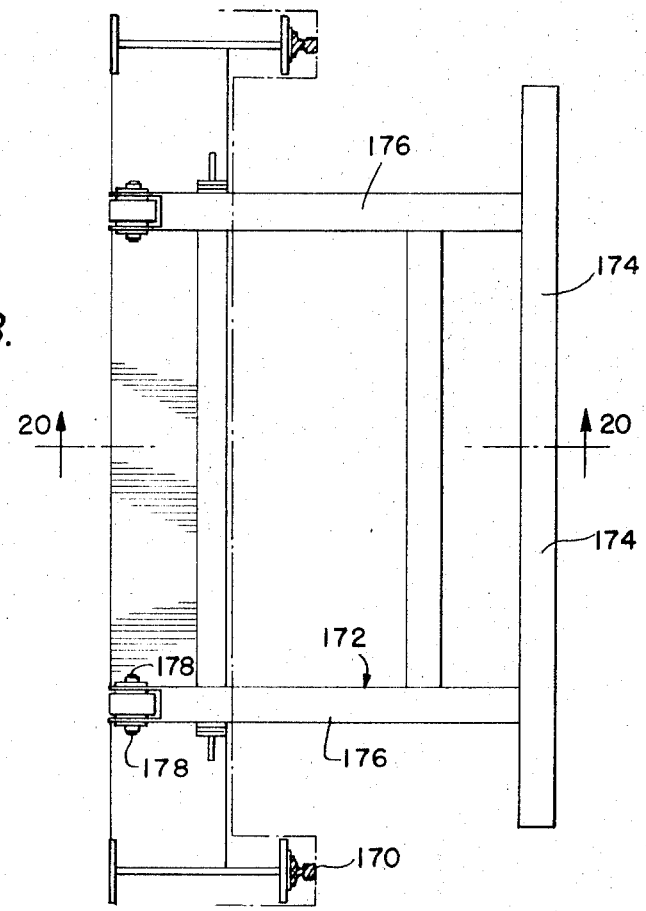
FIG. 18 is an enlarged fragmentary plan view showing a unit support structure in the river barge.
Figure 19:
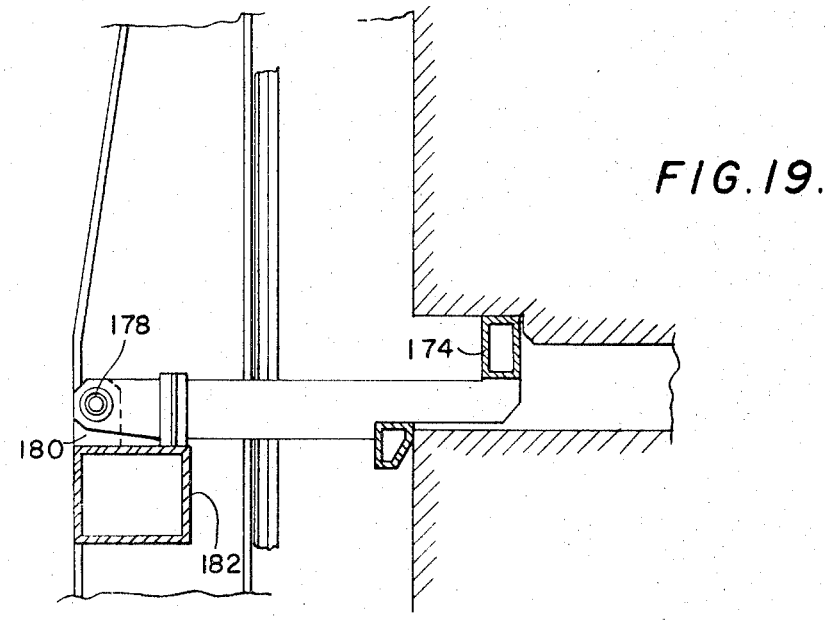
FIG. 19 is an enlarged fragmentary cross-section taken on line 19—19 of FIG. 18.
Figure 24:
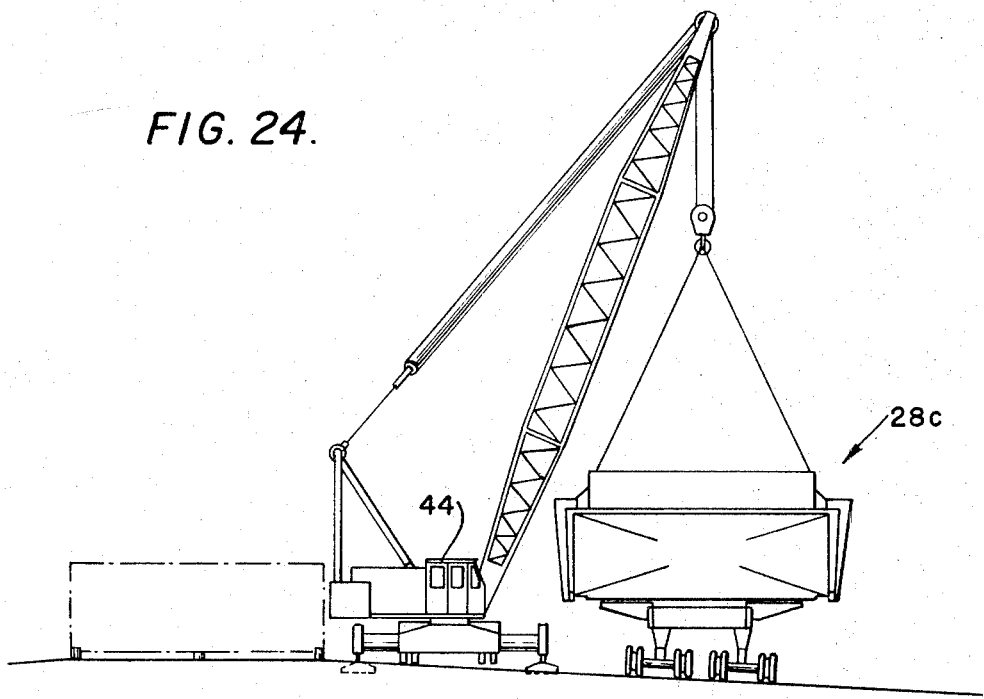
FIG. 24 is a side elevation showing transfer of a housing unit from the transporter to a permanent site foundation using a project crane.
Figure 25:
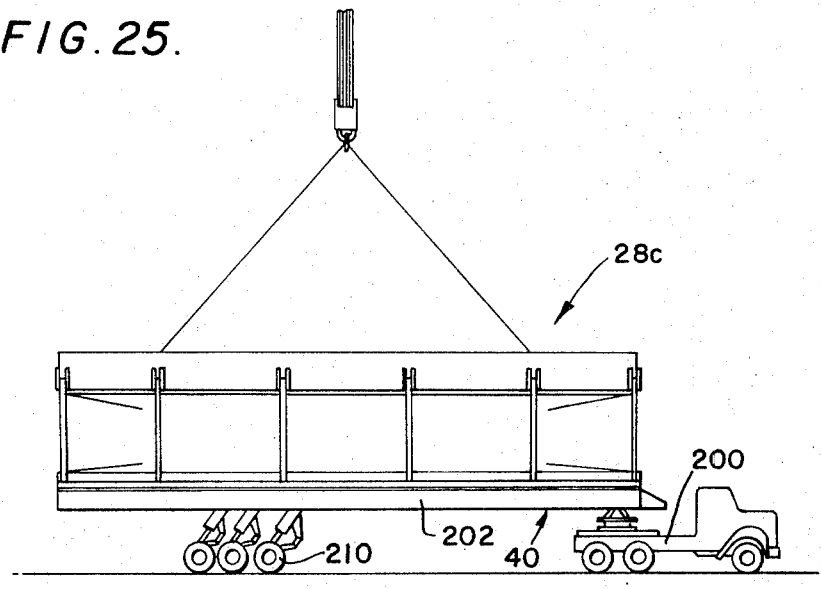
FIG. 25 is a side elevation of the lift spreader being handled by the project crane at the foundation site.

As shown in FIGS. 17–19 of the drawings, the columns 168 enable multi-tier stowage of the housing units 20 on the river barges 30 in a manner similar to that of the sea-going barge 22. Hence, pivotal housing unit supports 172 each having a joist engaging beam 174 carried on the outer ends of a pair of lever arms 176 are cantilevered into the river barge hold in substantially the same manner as the cell supports 106 in the sea-going barge 22. As shown in FIG. 20, the arms 176 are pivoted by pintles 178 supported by brackets 180 carried by box beams 182 extending between the columns 168.

The preferred manner of unloading the river barges 30 at the project under development is through the use of a project terminal illustrated in FIG. 20 of the drawings. Essentially, the terminal illustrated in FIG. 20 includes several pairs of elevated housing unit storage support rails 186 in the vicinity of the river barge dock 34 to which the housing units 20 are transferred by the barge carrier 32. As illustrated in FIGS. 16 and 20 of the drawings, this unloading operation is effected first by aligning the river barge 30 with the dock ramp 34 and positioning the bow extensions 162 on the barge over and upwardly facing a stable ledge 36 forming part of the docking structure. Thereafter, the barge 30 is ballasted at least at its bow end by appropriate ballasting means (not shown) so that the deck 164 of the barge forms a continuation of the dock ramp 34. The barge carrier 32, as shown most clearly in FIGS. 15, 16 and 21 of the drawing, is in the form of a self-powered mobile straddle truck having individually driven and steerable pneumatic wheels 188 carried at the lower end of generally vertical legs 190 connected at their ends by bridges 192. The entire carrier 32 is adapted to be driven under the control of the operator situated in a control cab 194. A spreader lift 28b, similar in all operational respects to the spreader lift 28 associated with the sea-going barge crane 26, is supported by the bridges 192 of the carrier 32. Thus, the carrier 32 can be advanced along the deck 164 of the river barge, positioned over a housing unit to be removed, the spreader lift 28b moved downwardly about the housing unit for subsequent lifting the traversing along the deck of the river barge onto the dock ramp 34 to position the housing units 20 on the support rails 186 of the barge terminal. Although the carrier 32 and spreader lift 28b shown in FIGS. 16 and 21 are of a size capable of handling only single store units 20, it will be appreciated that these components may be modified to handle two-story units 20a merely by increasing the height of the carrier 32 and the length of the support arms on the spreader lift 28b.

Figure 21:
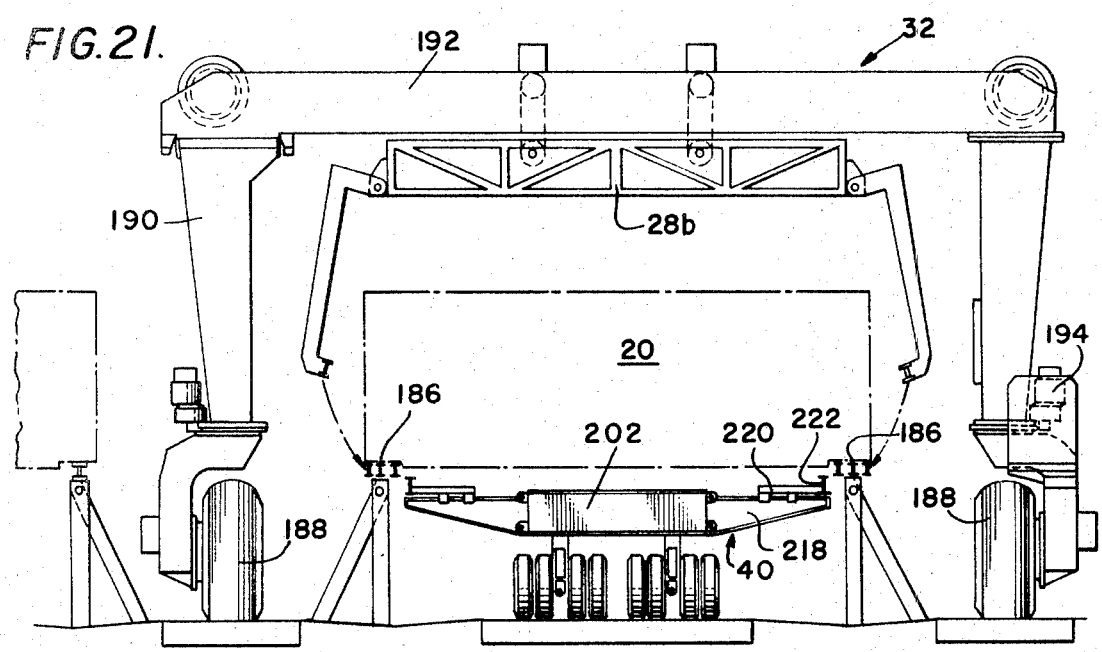
FIG. 21 is an enlarged fragmentary plan view of a unit carrier adapted to be transported with the river barge but in position at the project barge terminal shown in FIG. 20.

The structure of the truck transporter 40 by which the housing units 20 are transferred from the project barge terminal 38 to project lot sites is illustrated most clearly in FIGS. 21–23 of the drawings. As shown in FIGS. 22 and 23, the truck transporter 40 is essentially a tractor-drawn trailer, the tractor and trailer being designated in the drawings by reference numerals 200 and 202, respectively. Connection of the trailer to the tractor is effected by a conventional fifth wheel pivot 204. In accordance with the present invention, however, the fifth wheel pivot is supported for vertical lifting with respect to the body of the tractor 200 by a combination of a piston cylinder unit 206 and a pivotal beam 208. The remaining support for the trailer unit 202 is provided by six sets of wheels 210 supported on beams 212 in turn carried at the lower ends of steerable caster members 214. A hydraulic piston cylinder unit 216 is provided on each of the wheel sets of enable independent or simultaneous lifting movement of the trailer 202 on the wheels 210.

As shown in FIGS. 21 and 22 of the drawings, the trailer unit 202 is provided with laterally extending outriggers 218 supporting at their upper ends laterally adjustable carriages 220 in turn supporting at their outer ends, continuous longitudinally extending housing unit support beams 222. Thus, and as shown in FIG. 21 of the drawings, the trailer 202 is adapted to be driven under the housing units 20 supported on the elevated storage rails 186 at the barge terminal 38. Thereafter, the trailer unit is elevated with a concurrent lateral positioning of the support beams 222 by appropriate adjustment of the carriages 220 on the outriggers 218 until the beams 222 engage and lift the housing units 20 gently and upwardly off of the storage rails 186. Thereafter, the truck transporter 48 is driven away from the storage rails 186, carrying the housing unit 20 in the same manner in which it was lifted for loading the sea-going barge at the factory site in the manner described above; that is, by continuous engagement at opposite ends of the floor joists extending beneath the unit 20.

Upon reaching the lot at which a foundation 42 has been prepared for a particular housing unit, the transporter 48 is first positioned with respect to the project crane 44 and then the trailer unit 202 is leveled by adjustment of the piston-cylinder units 206 and 216 independently through control means (not shown). Such leveling adjustment of the loaded trailer unit is possible because of the three points of support provided by the fifth wheel 204 and wheels 210. The unit is then lifted by the project crane 44 using a spreader lift 28c similar in terms of functioning components to the spreader lifts 28 and 28b associated respectively with the sea-going barge crane 26 and the mobile river barge carrier 32. Thereafter, and as described above with respect to FIG. 1D of the drawings, the housing unit is completed by placement of the roof, garage and exterior trim as desired.

Thus it will be appreciated that by this invention there is provided a unique and highly effective system by which factory completed housing units with finished and mechanically operable living space interiors may be transported and ultimately placed on permanent site foundations for exterior completion while at all times maintaining the structural integrity customarily supplied by a permanent unit foundation, thereby to fulfill the previously stated objectives. The mobile foundation-like support effected initially by the dolly 12 on which the floor unit 11 of each housing unit is assembled prevails throughout the entire transporting and handling operation by virtue of the support offered by the spreader lift 28, the hold supporting members 106 in the sea-going barge 22, the support beams 174 in the holds of the river barges 30, the spreader lift 28b on the barge mounted carrier 32, the barge terminal storage rails 186, the truck transporter 40 and the spreader lift 28c of the project crane 44. Moreover, each of the transfer or handling and shipping operations is highly coordinated in a manner such that maximum efficiency is achievable both as a result of the method and apparatus employed during these operations in accordance with the present invention.

Many variations in particular procedures followed during the overall operation of the invention have been described in the preceeding text. Still further variations are both possible and contemplated in accordance with the present invention; such as for example, both of the barge structures shown may be used efficiently in the transportation of other cargo than housing units as may be desirable to avoid dead-run travel of the barges on return trips to the factory by the sea-going barge 22 and from the project site by the river barges 30. Still further variations and/or modifications of the embodiments disclosed above are contemplated and will be apparent to those skilled in the art. It is expressly intended therefore, that the foregoing description is illustrative only of preferred embodiments, not limiting, and that the true spirit and scope of the present invention be determined by reference to the appended claims.

We claim:

1. Apparatus for handling and transporting factory constructed housing units each providing completely finished, mechanically operable interior living space ranging in single floor area size to 2,000 square feet or more and having structural integrity only discrete transverse sections defined in part by transverse beam members establishing floor support of sufficient strength to carry the full dead load of the housing unit when supported only the near of ends of such members, the housing units being of a common width and varying only in length to provide the range of floor area size, said apparatus comprising: a combination of lifting transfer devices and transporting units, said lifting transfer devices each comprising a spreader lift means including a pair of generally parallel rigid, continuous linear support members each of a length at least as long as the housing unit to be transferred, means supporting said support members for movement between a retracted position spaced from each other by a distance in excess of the common house width and in which the spreader lift means can be lowered downwardly over a housing unit and a lifting position in which said support members engage the underside of the housing unit transverse beam members near the outer ends thereof and means to maintain said linear support members in mono-planar relation at least while in said lifting position irrespective of floor area loading variation in the housing unit; said transporting units each having a supporting frame structure and another pair of generally parallel rigid linear and mono-planar support members for engaging the undersides of the housing unit transverse beam members also near the ends thereof but inwardly of said first mentioned linear support members of said lifting transfer devices, said other support members being upstanding rails having top surfaces elevated in relation to the supporting frame structure of said transporting units located outwardly of said other support members sufficient to provide clearance space under the housing units enabling movement of said first mentioned support members from said retracted position to said lifting position, whereby said housing units may be supported by non-deflecting mono-planar linear support means along closely adjacent parallel lines of support during $a$ succession of lifting transfer and transporting operations in moving the housing unit from a factory to a remotely located building site.

2. The apparatus recited in claim 1 comprising interengagable vertical guide means cooperable between said transfer device and said transporting unit to restrain relative lateral shifting of said device and said unit during transfer of support for said housing unit between said device and said unit.

3. The apparatus recited in claim 1 wherein said spreader lift means comprises a rigid superstructure and a plurality of depending arms pivotally supported on opposite sides of said superstructure, said first mentioned support members being carried by said arms.

4. The apparatus recited in claim 3 wherein said superstructure comprises a main frame section and a pair of extensible subframe sections adjustably positioned at each end of said main frame section to accommodate housing units of different lengths.

5. The apparatus recited in claim 3 wherein said first mentioned support means comprises upwardly facing beams carried at the lower end of said depending arms, said beams being spaced inwardly of said arms to enable positioning thereof under said housing units.

6. The apparatus recited in claim 1 wherein said transporting unit comprises a low surface reaction land vehicle having a rigid mono-planar bed, said other pair of linear support members extending longitudinally on said bed, an independent vertically adjustable means supporting said rigid bed on ground engaging wheels to establish at least three laterally spaced points of support whereby said bed and a unit thereon can be leveled.

* * * * *